United States Patent [19]

Takahashi et al.

[11] 4,087,844
[45] May 2, 1978

[54] TAPE RECORDERS WITH CASSETTE LOADING AND EJECTING MECHANISMS

[75] Inventors: Choku Takahashi, Higashi-Yamato; Katsutoshi Kinoshita, Tokyo, both of Japan

[73] Assignee: New Nippon Electric Co., Ltd., Osaka, Japan

[21] Appl. No.: 690,853

[22] Filed: May 28, 1976

[30] Foreign Application Priority Data

May 31, 1975 Japan .................................. 50-65553
May 31, 1975 Japan .................................. 50-74067
May 31, 1975 Japan .................................. 50-74068

[51] Int. Cl.² ...................... G11B 23/04; G11B 19/18
[52] U.S. Cl. ........................................ 360/96; 360/93; 360/105
[58] Field of Search ............... 360/96, 93, 92, 85, 360/105; 242/197–200, 194

[56] References Cited

U.S. PATENT DOCUMENTS

| | | | |
|---|---|---|---|
| 3,445,116 | 5/1969 | Knox | 360/93 |
| 3,675,876 | 7/1972 | Frederick | 360/93 |
| 3,684,295 | 8/1972 | Strain | 360/105 |
| 3,800,323 | 3/1974 | Jenkins | 360/96 |
| 3,800,328 | 3/1974 | Harlan | 360/96 |
| 3,820,158 | 6/1974 | Schober | 360/105 |
| 3,902,680 | 9/1975 | Neff | 360/85 |
| 3,947,883 | 3/1976 | Suzuki | 360/96 |

Primary Examiner—Alfred H. Eddleman
Attorney, Agent, or Firm—Charles E. Pfund

[57] ABSTRACT

The tape recorder is provided with a cassette guiding device including a tiltable cassette loading platform pivotably mounted at one end, spring means for normally holding the platform in an inclined position for receiving an inserted cassette and for permitting the platform to rotate to the horizontal position, a guide member for loading the cassette at an operating position when the platform is rotated to the horizontal position. A cassette containing chamber is formed by a cassette inserting section provided with an opening for passing the cassette, a door for normally closing the opening and shoulders for guiding the cassette to the platform, and a cassette loading section containing the cassette loading platform. There is provided a door operating mechanism including a door locking member for locking the door in the opened position, a sliding member interlocked with the door locking member, and a door operating button mounted on the sliding member for causing the door locking member to release the door. There is also provided a cassette ejecting mechanism including an ejecting button interlocked with the door such that the ejecting button is operable when the door is opened but not operable when the door is closed and a cassette push-up lever operated by the ejecting button for returning the cassette loading platform to the inclined position.

13 Claims, 13 Drawing Figures

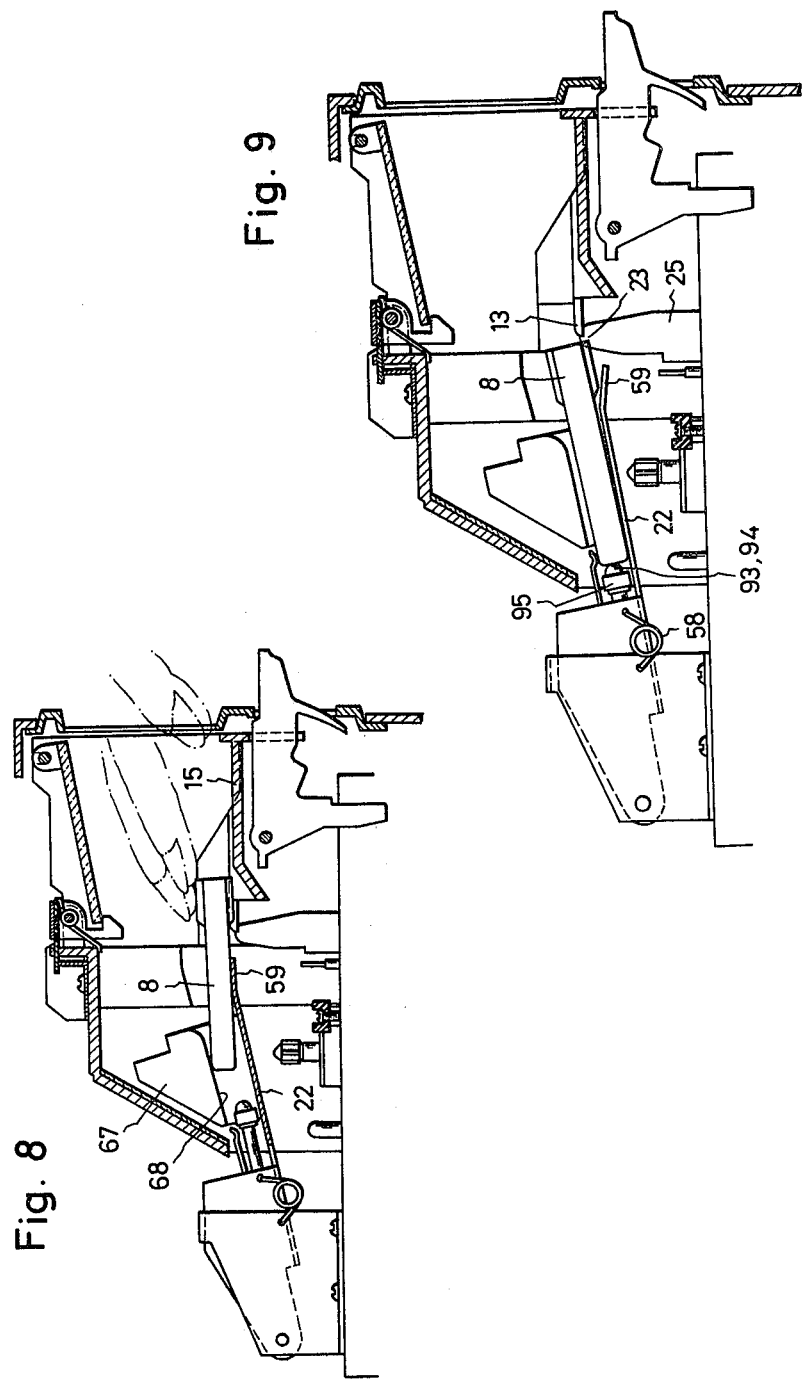

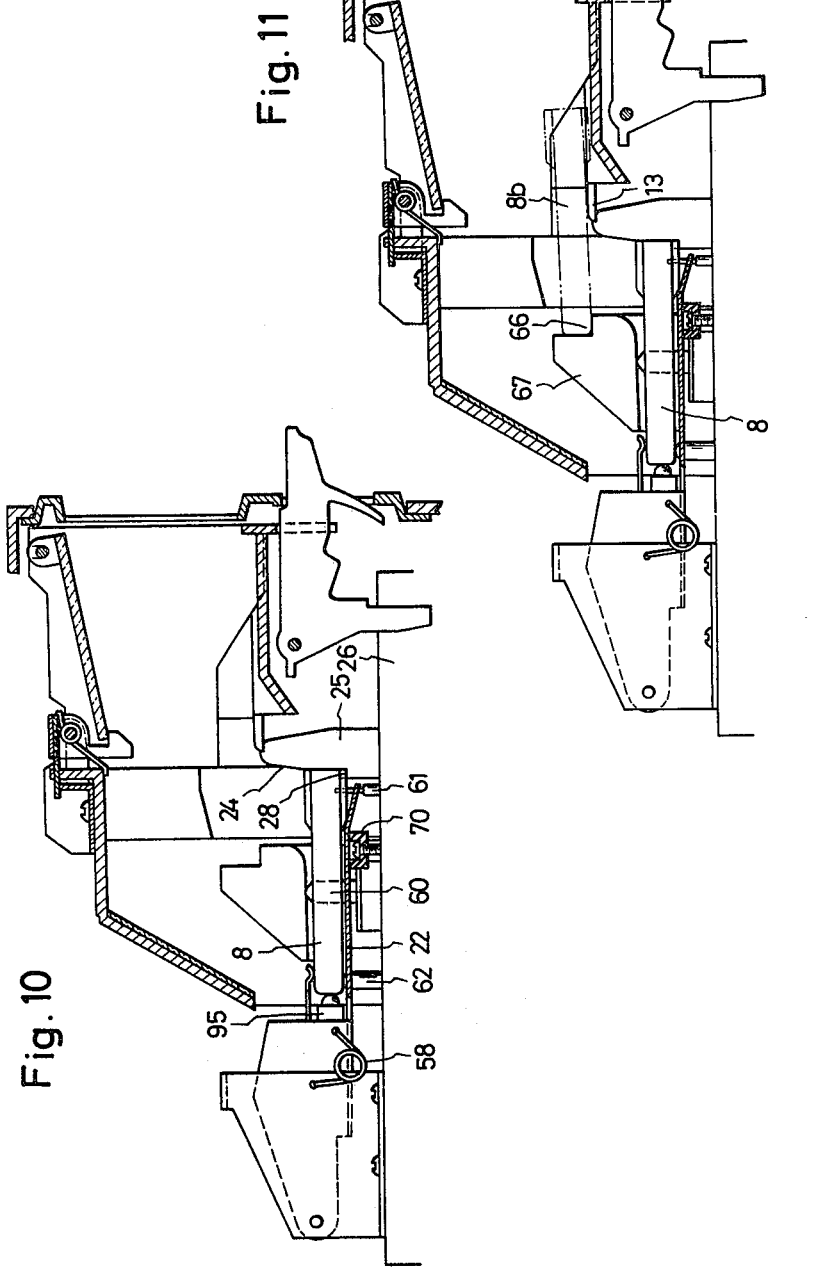

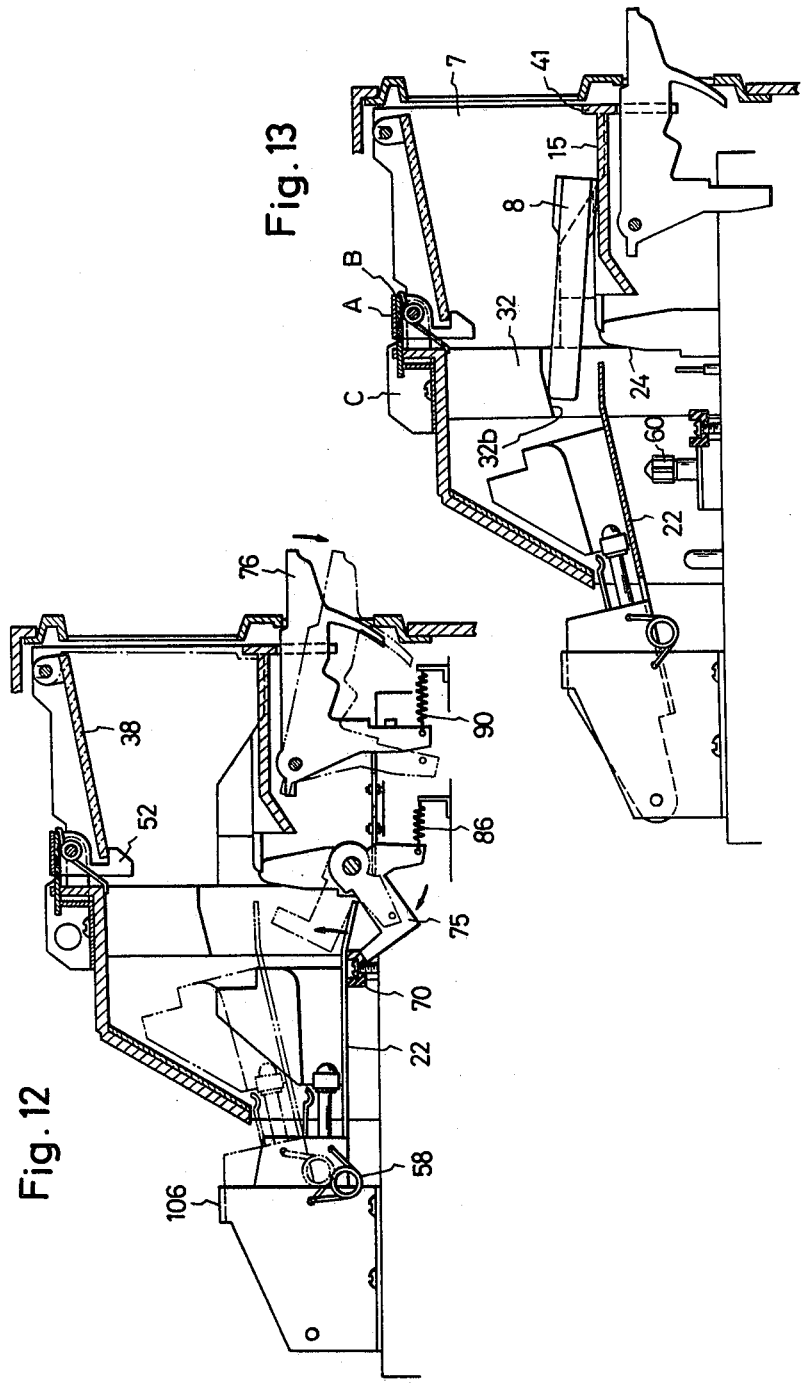

TAPE RECORDERS WITH CASSETTE LOADING AND EJECTING MECHANISMS

BACKGROUND OF THE INVENTION

This invention relates to a cassette tape recorder wherein recording and reproduction of sounds are made by using a tape cassette (hereinafter merely called a cassette) of the type known as a compact cassette, and more particularly to a cassette tape recorder provided with a novel cassette guiding device, a door operating mechanism and a cassette ejecting mechanism.

In the cassette tape recorder of this type, there has been proposed a cassette loading device called as a "kangaroo pocket" wherein the front of a cassette container is pulled down or a type in which a cassette is loaded in the horizontal state on an operating plate rotatably mounted in the cassette container and the operating plate is inclined at the time of operating the tape recorder.

In both type, these prior-art types however, as the sound recording and reproduction are made while the cassette is maintained in the vertical or inclined posture, the real shafts used to support the cassette during recording and reproduction of the sounds are subjected to an unbalanced force thus causing unequal wear of the bearing metals journalling the driving shaft. Such unequal wear of the bearing metals causes vibration of the driving shaft and noise. Further, as the cassette holding mechanism is maintained at the vertical or inclined position, the running of the tape during sound recording and reproduction becomes unstable.

In addition the operator often inadvertently inserts a second cassette while a first cassette is being played. Further, it is desirable to quickly remove or eject the cassette by one operation.

SUMMARY OF THE INVENTION

Accordingly it is an object of this invention to provide a cassette tape recorder having an improved cassette guiding mechanism that can promptly and accurately load the cassette in a stable operating position.

Another object of this invention is to provide a cassette tape recorder provided with a door that prevents inadvertent insertion of a second cassette while a first cassette is being played.

A further object of this invention is to provide a cassette tape recorder having a door and door operating mechanism which can lock the door in the opened and closed positions.

Still further objects of this invention is to provide a cassette tape recorder having an improved cassette ejecting mechanism interlocked with the door operating mechanism such that the ejecting mechanism is permitted to operate to eject the cassette from the operating position when the door is opened.

According to this invention there is provided a cassette tape recorder comprising a cassette loading platform rotatably mounted at one end thereof, means for normally maintaining the cassette loading platform at an inclined position at the time of inserting a cassette into the tape recorder with the other end of the platform maintained at a higher level than said one end, said means permitting the platform to rotate to the horizontal position, a guide member for loading the cassette at a predetermined operating position when the cassette loading platform is rotated to the horizontal position, a cassette containing chamber including a cassette inserting section provided with an opening for passing the cassette and shoulders for guiding the cassette, while maintaining the same at a horizontal posture, to the other end of the cassette loading platform maintained at the inclined position, and a cassette loading section for containing the cassette loading platform.

According to another aspect of this invention there is provided a cassette tape recorder comprising a cassette containing chamber having an opening for passing a cassette; a door pivotally mounted on the upper end of the opening; and a door operating mechanism including a door operating mechanism including a door locking member disposed in the cassette containing chamber for locking the door in the opened position, a supporting member for the door locking member and provided with a rotatably supported shaft, a sliding member interlocked with the door locking member and disposed on the side surface of the cassette containing chamber, and a door operating button mounted on the sliding member, whereby when the button is operated, the sliding member is moved to cause the door locking member to release the door.

According to still another aspect of this invention there is provided a cassette tape recorder comprising a cassette inserting section including an opening for passing a cassette; a door pivotally mounted on the cassette inserting section for closing the opening; a cassette loading section connected to the inserting section to form a cassette containing chamber therewith; means for normally maintaining the cassette loading platform in an inclined position for receiving the cassette inserted through the opening; said means permitting the platform to rotate to the horizontal position thereby loading the cassette at a horizontal operating position; and a cassette ejecting mechanism including an ejecting button interlocked with the door such that the ejecting button is operable when the door is maintained in the opened position but not operable when the door is maintained in the closed position, and a cassette push-up lever located beneath the cassette loading platform and operated by the ejecting button for returning the cassette loading platform to the inclined position.

BRIEF DESCRIPTION OF THE DRAWINGS

Further objects and advantages of the invention can be more fully understood from the following detailed description taken in conjunction with the accompanying drawings in which:

FIGS. 8 through 11 are sectional views for explaining the manner of loading the cassette; and FIGS. 12 and 13 are sectional views for explaining the manner of ejecting the cassette.

DESCRIPTION OF THE PREFERRED EMBODIMENT

Figure 1:
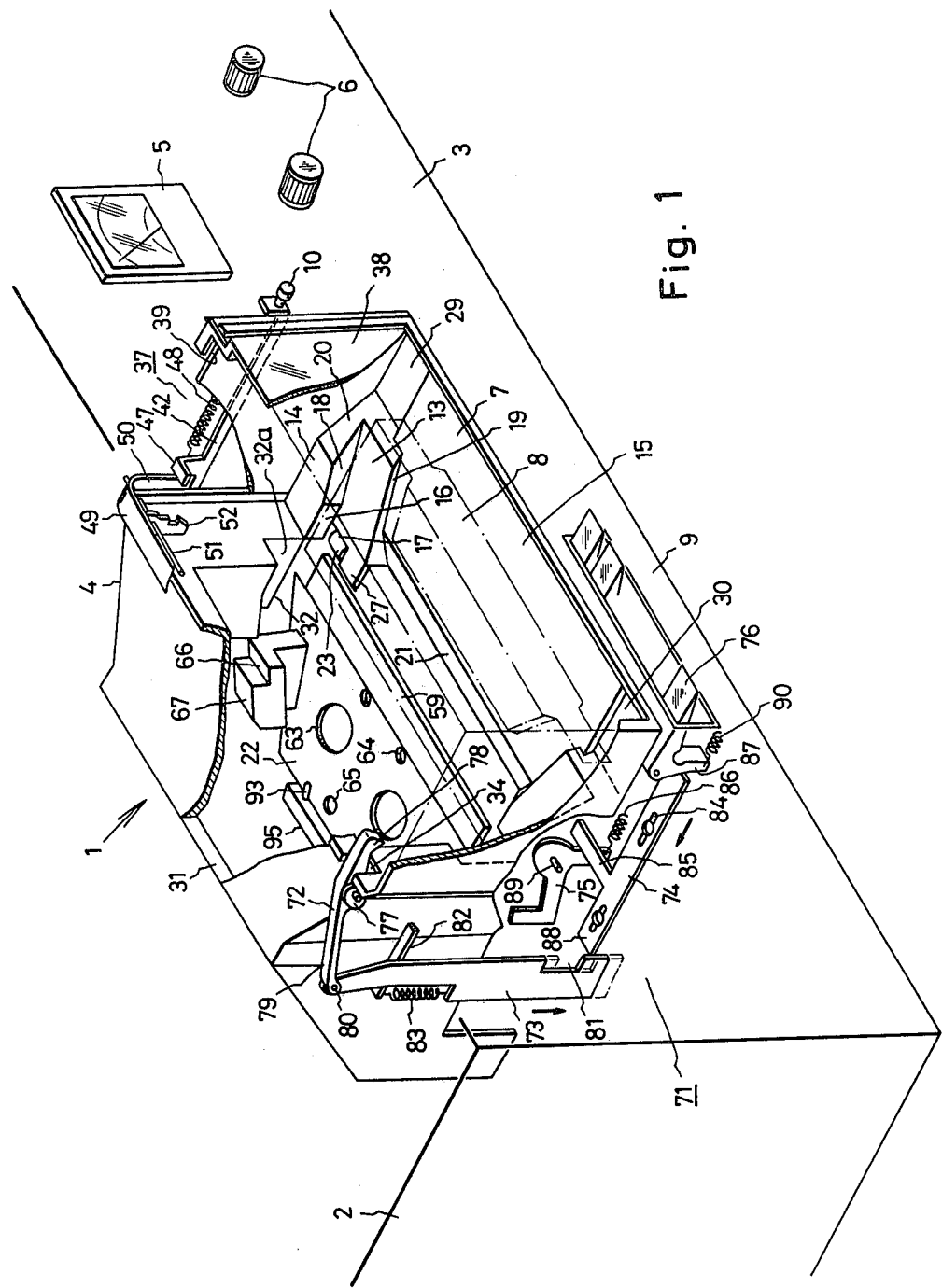
FIG. 1 is a perspective view, partly broken away, of a cassette recorder incorporated with a cassette guiding apparatus, a door operating mechanism, and a cassette ejecting mechanism of this invention.

FIG. 1 is a perspective view, partly in section, of a cassette tape recorder 2 incorporated with a cassette guiding apparatus, a door operating mechanism and a cassette ejecting mechanism of this invention. A cassette containing chamber 4 is opened to the front panel 3 of a cubical frame work having suitable dimensions. A level meter 5 and a knob 6 of a volume adjuster are also mounted on the front panel 3. The cassette containing chamber 4 is formed as a symmetrical integral unit by moulding a synthetic resin.

Figure 2:
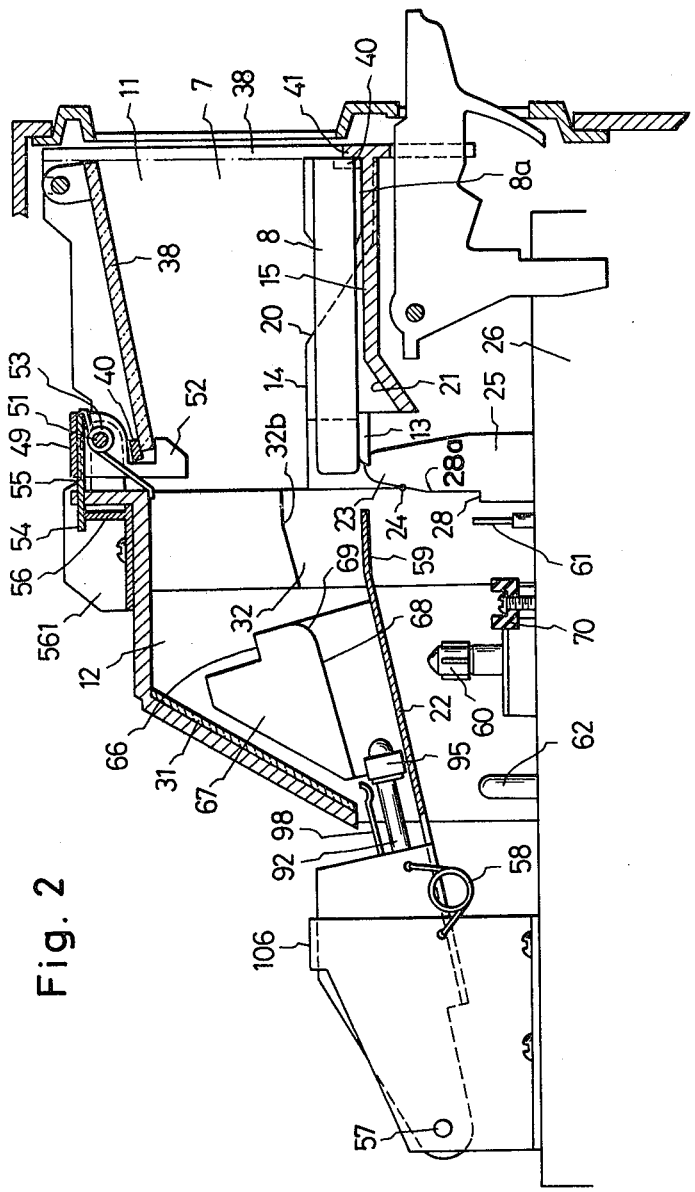
FIG. 2 is a longitudinal sectional view of the cassette tape recorder shown in FIG. 1.

The opening 7 of the cassette containing chamber 4 is sufficiently larger than the width of a cassette 8 shown by dot and dash lines in FIG. 1 and has height enough to load and unload the cassette by inserting the hands in the cassette containing chamber 4. Operating buttons 9 are provided beneath opening 7 and a door operating button 10 is provided on the righthand side of the opening. As best shown in FIG. 2, the rear lower side of the cassette containing chamber 4 is open and the front portion thereof is used as the cassette inserting section 11 while the rear side is the cassette loading section 12.

The cassette inserting section takes the form of a box, and first shoulders 13 and second shoulders 14 are formed on both side walls to confront with each other. The first shoulders 13 are at a level slightly higher than the bottom wall 15, while the second shoulders 14 are located at a level higher than that of the first shoulders by a height substantially equal to the thickness of a cassette 8. One side surface 16 of the second shoulder 14 is parallel with the direction of insertion of the cassette 8. The spacing between opposing side surfaces of the inserting section 11 is made slightly larger than the width of the cassette 8 for the purpose of guiding the cassette inserted through opening 7 to a predetermined position of the rear cassette loading section 12. A notch 17 is formed at the rear end of each first shoulder 13 and the width of the first shoulder 13 is gradually increased toward the front side. The side wall 18 of each second shoulder 14 that is joined to the first shoulder 13 is vertical and the side wall 19 of the first shoulder 13 connected to the bottom wall 15 is inclined with respect to the vertical. The first and second shoulders 13 and 14 are provided with a common inclined surface 20 that inclines from the rear side to the front side. These side walls 18 and 19 and the inclined surface 20 act as the guide surfaces for inserting the cassette. When the cassette is horizontally inserted through opening 7 as shown in FIG. 2, even if the cassette is slightly inclined or held closer to one side (righthand or lefthand side), the direction of insertion can be corrected by these guide surfaces in the following manner. More particularly, the inclination of the cassette is corrected by the inclined surface 20, whereas the shifting to the right or left is corrected by side wall 18 or 19. As a result, the cassette 8 is guided correctly between opposed side surfaces 16. The inner or rear end of the bottom wall 15 near the loading section 12 is provided with a downwardly inclined surface 21. This construction permits deeper insertion of fingers at the time of inserting the cassette. Further, a space is left between the cassette loading platform 22 and the inclined surface 21 for making easy the operation in a deep position. Flat surfaces 29 and 30 on the opposite sides of the front end of the bottom wall 15 are formed at a lower level than the main surface of the bottom wall 15 for the purpose of making it possible to readily grasp the cassette 8 at the time of withdrawing it from the inserting section 11. For this reason, the width of the bottom wall 15 near the inlet opening is somewhat wider than the width of the cassette. The flat surfaces 29 and 30 at a lower level can be omitted if desired, but when they are provided, they give an impression to the user as if the inlet opening were wide and enable a blind man to readily insert and remove the cassette.

A guide member 25 having a round top and inclined side surface 24, as shown in FIG. 2, is secured on a chassis 26 to project into the notch 17 of the first shoulder 13. The round upper end 23 of the guide member 25 is positioned at a slightly lower level than the first shoulder 13 and it is advantageous to make equal the radius of curvature of the round upper end 23 and that of the projection 27 of the first shoulder 13. Such curved surfaces and the inclined surface 24 of the guide member 25 act as the guide surfaces in the vertical direction for the insertion and removal of the cassette. At the lower portion of the inclined surface 24 of the guide member 25 is formed a shoulder 28 for receiving the lower surface of the cassette. A vertical guide surface 28a terminating in the shoulder 28 guides the cassette, permitting an accurate and steady positioning of the cassette relative to the magnetic head (not shown but located in front of the cassette being played). The guide member 25 may be formed integral with the cassette containing chamber 4, if desired.

The rear wall of the cassette loading section 12 may be inclined for bonding a mirror 31 and the lower end is opened for accommodating the cassette loading platform 22. A portion on the front side of both sides of the section 12 is projected inwardly to form shoulders 32 which are used to connect the section 12 to the cassette inserting section 11 as shown in FIG. 2. The side surface 32a beneath the shoulder 32 is formed to be flush with the vertical side surface 16 of the second shoulder 14 of the cassette inserting section 11 and its upper surface 32b is bent in the form of a V to act as a guide surface. As shown in FIG. 2, the shoulder 32 is formed to be substantially parallel with the surface of the cassette loading platform 22 having a horizontal surface near the cassette inserting section 11 and a rear surface inclined downwardly. The vertical distance between the horizontal surface of the shoulder 32 and the first shoulder 13 of the cassette inserting section 11 is made to be slightly larger than the thickness of the cassette.

Figure 3:
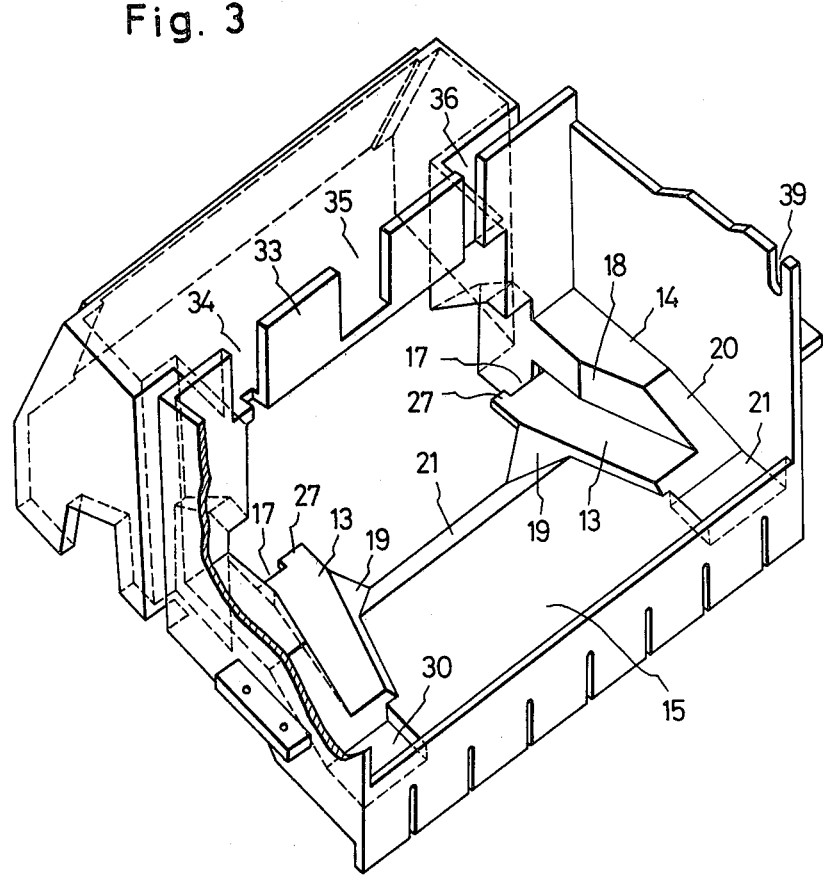
FIG. 3 is a perspective view of a cassette containing chamber which is cut away from FIG. 1.

As shown in FIG. 3, a vertical wall 33 is provided at substantially the center of the upper surface of the cassette containing chamber 4 for dividing the chamber 4 into the cassette inserting section 11 and the cassette loading section 12. The vertical wall 33 is formed with three notches 34, 35 and 36 which are used to mount a door operating mechanism 37 in a manner to be described later.

The door 38 operated by the door operating mechanism 37 is constructed as follows. The door 38 is biased by a spring, not shown, for normally closing the front opening 7 of the cassette containing chamber 4 and is made of transparent or translucent synthetic resin such as acrylic resin. The door 38 is pivotally mounted in recesses 39 (See FIG. 3.) at the upper edges of the side walls of the cassette inserting section 11 by means of trunnions. The door is normally held at the closed position in which a stopper 40 provided at the lower end of the door is urged against a vertical edge 41 at the fore end of the bottom wall 15 of the cassette containing chamber 4. The door is rotated by the operator to the open position shown by solid lines in FIG. 2.

Figure 4:
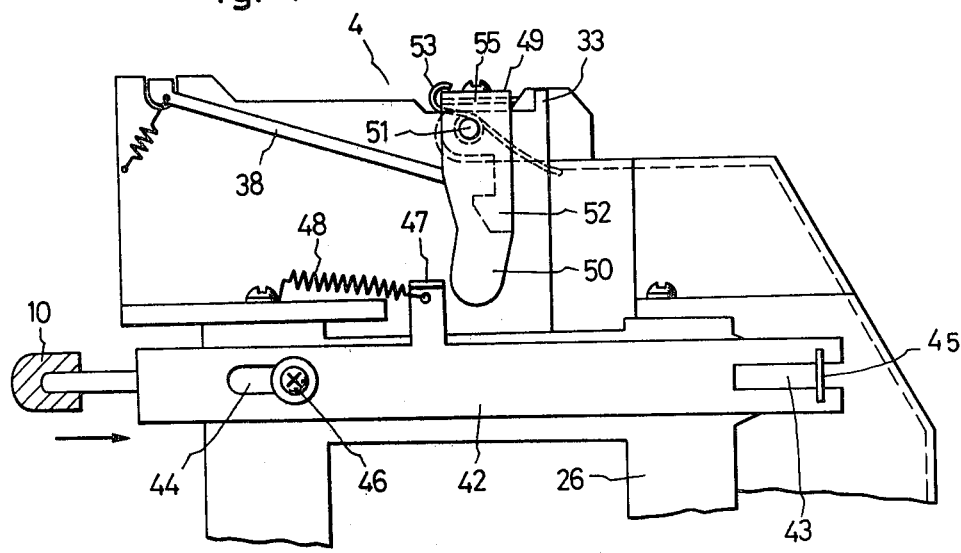
FIG. 4 is a front view showing a door opening and closing mechanism.

The door operating mechanism 37 is interlocked with the door operating button 10 shown in FIG. 4 which is secured to one end of a sliding member 42 extending to the rear side along the side wall of the cassette containing chamber 4, as shown in FIG. 4.

Figure 5:
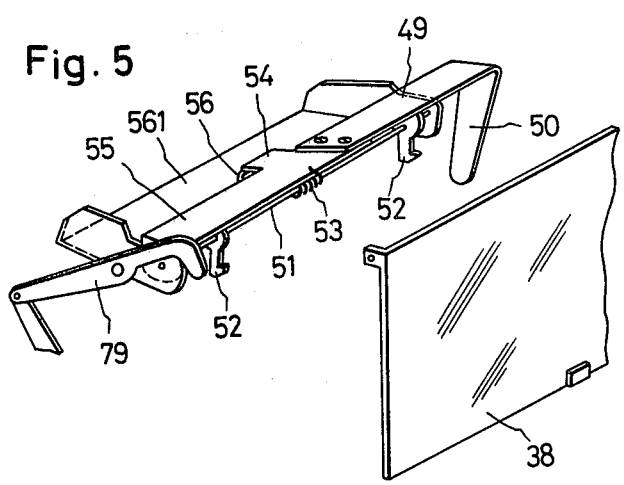
FIG. 5 is a perspective view showing the door opening and closing mechanism.

The sliding member 42 is provided with two notches or slots 43 and 44 for receiving guide pins 45 and 46 secured to the frame 26. The sliding member 42 is further provided with a vertical inverted-L-shaped member 47 which is connected to frame 26 through a spring 48 for urging the door operating button 10 to normally project from the front panel 3. The member 47 is arranged to engage a member 50 suspending from a plate member 49 disposed in the upper portion of the cassette containing chamber 4. The plate member 49 is connected to a plate 55 having two hook shaped door locking members 52 which are secured to a shaft 51 supported by a supporting member 561 secured to the upper portion of the cassette containing chamber 4. The plate member 49, the plate 55 and the door locking members 52 are biassed to rotate in the clockwise direction as viewed in FIG. 4 by means of a coil spring 53. As shown in FIGS. 2 and 5, the plate 55 is provided with a projection 54 adapted to engage a projection 56 provided for the supporting member 561, thereby maintaining the plate 55 in the horizontal position. Accordingly, when the button 10 is depressed as shown by an arrow in FIG. 4, the plate 55 is rotated against the force of spring 53 thereby releasing the locking member 52 for the door 38. To permit this rotation of plate 55, the portion of the cassette inserting section 11 adjacent the vertical wall 33 of the cassette containing chamber 4 is formed at a low level.

As best shown in FIG. 2, cassette loading platform 22 extends into the lower opening of the cassette loading section 12 and its rear end is pivotally mounted on brackets 102 and 103 (to be described later) through a pivot shaft 57 so that when the cassette is not loaded on the platform, the platform 22 assumes an inclined position such that its fore end is at a higher level than the rear end. When loaded with a cassette, the platform 22 is maintained in the horizontal position. An α spring 58 is used to support the platform 22 at two spaced points. In its inclined position, the fore end 59 of the cassette loading platform 22 is maintained in the horizontal position at slightly lower level as compared with the first shoulder 13, and the platform 22 is provided with perforations 63, 64 and 65 (See FIG. 1.) for receiving the reel shaft 60 of the tape recorder, a guide pin 61 and a cassette supporting rod 62, respectively. Horizontal guide members 67 each having a shoulder 66 on the side thereof close to the cassette inserting section 11 are secured to both sides of the cassette loading platform 22. The horizontal guide members 67 not only serve to guide cassette 8 to the platform 22 at the normal posture but also to provide guide surfaces when the cassette is inserted through the cassette loading platform 22. Each horizontal guide member 67 takes the form of L with its lower side bent inwardly to cover the cassette loading platform 22. The upper surface 68 of each horizontal guide member 67 is substantially parallel with cassette loading platform 22 but slightly inclined such that the level of the upper surface 68 increases toward the cassette inserting section 11. Further, the guide members 67 are provided with round corners 69 for facilitating the insertion and removal of the cassette. A stop member 70 made of resilient material such as rubber is secured to the chassis 26 by screws at a position beneath the cassette loading platform 22.

As shown in FIG. 1, the cassette ejecting mechanism 71 mounted on the left side wall of the cassette containing chamber 4 comprises a lever 72, a plate member 72, a sliding member 74, a push-up lever 75 for the cassette loading platform and an ejecting push button 76. The lever 72 is pivotally supported by a bracket 77 secured to the upper portion of the cassette containing chamber 4. An arm 78 at one end of lever 72 protrudes into the cassette inserting section 11 through notch 34, whereas the other arm 79 of the lever 72 extends to the rear side along the upper wall of the cassette containing chamber 4 and is pivotally connected to the plate member 73 through a pin 80. The plate member 73 is disposed substantially vertically and is provided with a lateral notch 81 near its lower end. The plate member 73 is biassed upwardly by a tension coil 83 with one end secured to frame 82. Slide member 74 is positioned at right angles with respect to the plate member 73 and is movable within a limit determined by the length of slot 84. The slide member 74 is urged against the foot 87 of the ejecting button 76 by a tension spring 86 having one end connected to a projection 85. When the plate member 73 is lowered, the leading end 88 of the slide member 74 is caused to engage notch 81 if the ejecting button 76 is operated. The projection 85 is normally in contact with the push-up lever 75 for the cassette charging platform 22, which is rotatably supported by a pin 89. The ejecting button 76 is provided with a bias spring 90.

Figure 6:
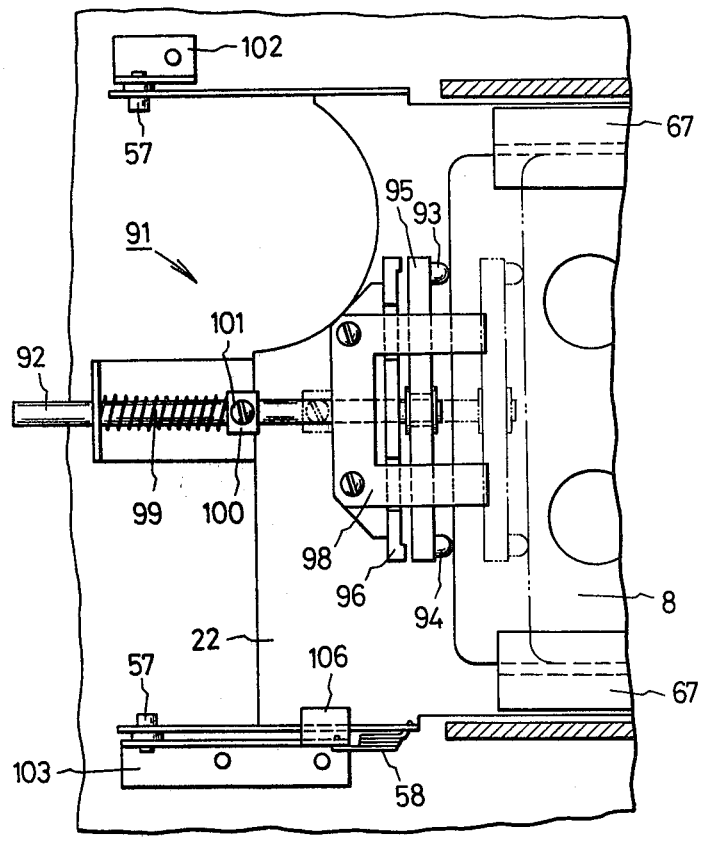
FIG. 6 is a plan view showing a cassette ejecting and stopping mechanism.
Figure 7:
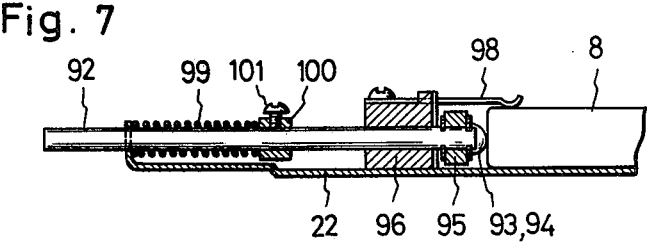
FIG. 7 is a sectional view of the mechanism shown in FIG. 6.

FIG. 6 is a plan view showing the cassette ejecting and stopping mechanism 91 and FIG. 7 shows a cross-sectional view thereof. In these figures, at the fore end of the ejecting shaft 92 is mounted free to incline a bar 95 having projections 93 and 94 at both ends. Accordingly, even when the cassette 8 is inserted in an inclined state, its posture will be corrected when bar 95 comes to engage stop member 96. A leaf spring 98 for urging the cassette 8 is secured to the upper surface of stop member 96 by screws. A compression spring 99 encircling shaft 92 normally urges the same toward the cassette, the biassing force of the spring 99 being adjustable by changing the position of a seat 100 by means of a screw 101. As shown by dot and dash lines, the seat 100 engages stop member 96 when the cassette is not inserted for determining the stroke of shaft 92. Accordingly, the adjustment of the position of the seat 100 not only adjusts the force of spring 99 but also adjusts the stroke of shaft 92. Brackets 102 and 103 are provided to journal the shaft 57 of the cassette loading platform 22, and projection 106 is provided for the upper end of bracket 103 for engaging the upper surface of the platform 22. One end of bracket 103 is connected to the cassette loading platform 22 via spring 58. Accordingly, the upward movement of the platform 22 imparted by spring 58 is limited by projection 106, while the downward movement is limited by stop 70 made of rubber or the like.

The cassette is loaded in the following manner. First door 38 is opened and the cassette 8 is inserted into the cassette inserting section 11 through opening 7. At this time, the cassette 8 once engages one of the side wall 18 and then advances between opposing side surfaces 16. The opposite ends of the bottom wall of the cassette 8 ride on the first shoulders 13 and the bottom projection 8a of the cassette slides along the bottom wall 15. As the cassette 8 is inserted further, the rear end of the cassette rides on the end portion 59 of the cassette loading platform 22 until the rear end comes to engage the upper surface 68 of the horizontal guide member 67. Thereafter, the cassette is gradually inclined downwardly along the upper surface 68, as shown in FIG. 8. FIG. 9 shows the position of the cassette when it is inserted further after the rear end of the cassette has engaged the projections 93 and 94 of the bar 95. Accordingly, shaft 92 is caused to retract against the force of spring 99. The fore end of the cassette disengages from the first shoulders 13 and then supported by the round portion 23 at the upper end of guide member 25. At this time, the cassette 8 is substantially completely transferred onto the platform 22. Then, when the cassette is pushed forwardly and downwardly by the fingers of the operator the platform 22 is automatically rotated by the aid of α spring 58 to assume the horizontal position until stopped by stop member 70. Concurrently, the cassette 8 slides down along the inclined surface 24 of guide member 25 and finally received by shoulder 28. Under these conditions, the cassette 8 automatically fits on the reel shaft 60.

As the rear end of the cassette 8 is supported by the cassette supporting rod 62 the cassette will be held in the horizontal position with a small gap between the cassette and platform 22 as shown in FIG. 10. Thus, the cassette is loaded at a predetermined position for the play.

The cassette loaded in this manner should be held horizontally at the predetermined position corresponding to a well known mechanism such as a magnetic head, not shown, secured to the chassis. The purpose of the gap between the cassette 8 and the platform 22 is to accurately guide the cassette while it is lowered from the horizontally inserted state to the loaded position. Accordingly, the correct posture of the loaded cassette is provided by the supporting rod 62, shoulder 28 of the guide member 25 and guide pin 61. Accordingly, the tape contained in the cassette can run stably while it is maintained in the horizontal position without being disturbed by the guide means of the cassette, whereby the mechanical and electrical characteristics of the tape are no interferred.

Under these loading conditions, when a second cassette is inadvertently inserted during playing the first cassette, since the second cassette 8b engages the horizontal shoulder 66 of he guide member 67 which lies on the extension of the upper surface of the first shoulder 13, it is impossible to advance further the second cassette, thus preventing damage of the inside apparatus of the player as well as adverse effect upon the first cassette under playing.

During playing, the door 38 is held in the closed position by operating the door operating button 10 for preventing inadvertent insertion of the second cassette and invasion of dust.

The cassette is removed by the following operation.

When the door 38 is maintained in the closed position as shown in FIG. 1, as the plate member 73 of the ejecting mechanism is urgent upwardly by spring 83, one end 88 of the slide member 74 abuts against the end of plate member 73 thus locking the same. In other words, so long as the door 38 is held in the closed position it is impossible to operate the ejecting button 76, whereby it is impossible to remove the cassette. When the door 38 is rotated to the opened position, it is arrested by the door locking member 52. At the same time, the door engages one end 78 of lever 72 to push it upwardly so that the plate member 73 descends to the dotted line position against the force of spring 83. In this manner, the notch 81 of the plate member 73 comes to oppose the end 88 of the slide plate 74, thus making it possible to operate the ejecting button 76. When this button is operated, the slide member 74 is moved in the direction of the arrow. At the same time, as the projection 85 rotates the push-up lever 75, the cassette loading platform 22 is pushed upwardly to the original position. FIG. 2 shows this condition. When the cassette loading platform 22 deviates from the horizontal position, it rotates to the original position and comes to abut against stop member 106 and then stopped at an inclined position of a predetermined angle of inclination by the α spring 58. Then the cassette 8 disengages from the reel shaft 60 and pushed to the opening 7 by the rapid restoring action of shaft 92 caused by the compression spring 99. FIG. 13 shows this condition. As the cassette 8 disengages from the inclined surface 24 it is ejected into the inserting section 11 by the restoring force of the shaft 92. At this time, however, as the end of the cassette 8 slides along the inclined upper surface 32b of the first shoulder 32, the bottom projection 8a of the cassette slides along the bottom wall 15 until it is stopped by edge 41. Consequently, it is possible to take out the cassette by inserting the hands through opening 7.

As has been described above in detail, according to the cassette tape recorder constructed in accordance with this invention, after the cassette has been inserted into the cassette containing chamber while maintaining the cassette in a horizontal posture, the cassette is loaded on a cassette loading platform which is rotatably mounted at one end and inclined at a predetermined angle. Then the cassette is positioned in a horizontal operating position by rotating the cassette loading platform to the horizontal position. These operations are simple and accurate. To remove the cassette, an ejecting button is operated to elevate the cassette loading platform thereby disengaging the cassette from the shaft of a reel. Then, the cassette is ejected outwardly by shaft 92 and its direction is changed by shoulder 32. Thereafter, the cassette is ejected into the inserting section 11. These operations are also simple and accurate. Furthermore, when the space in the inserting section is made large, it is possible to deeply insert the fingers into the space for loading the cassette. Moreover, the unique configuration of the first and second shoulders at the bottom of the cassette inserting section 11 assures positive guiding of the cassette to the platform as well as easy and accurate loading and removal of the cassette.

Further, the door operating mechanism is constructed such that the door 38 is latched in the opened position by the door locking member 52 when the door is rotated to the opened position, and that the door is closed by its own weight or by the action of a spring by merely operating door operating button 10. These operations are also simple. Thus, the door is maintained in the closed position other than desired thus preventing not only inadvertent insertion of the cassette as well as invasion of dust. When the door is held in the closed position, ejecting button 76 is rendered operative for removing the cassette. These operations are also simple permitting accurate ejection of the cassette. Moreover, the tape in the cassette is run while the cassette is maintained in the most stable horizontal position irrespective of the conditions of the cassette containing chamber, and cassette guiding devices including the cassette loading platform, whereby the electrical and mechanical characteristics of the tape are not affected.

As described above the cassette ejecting mechanism of this invention renders inoperable the ejecting button when the door is locked in the closed position so that it is possible to positively prevent inadvertent insertion of a second cassette while a first cassette is being played. Even when the second cassette is inserted while the door is open by erroneous operation of the operator, since the second cassette will be received by the guide member 67 there is no fear of damaging the cassette operating mechanism such as the reel shaft 60 and of colliding against the first cassette under play. When the door is opened for removing the cassette, the ejecting button becomes operable so that the cassette can be readily and positively removed.

What is claimed is:

1. A cassette tape recorder comprising a cassette loading section wholly containing a cassette loading platform rotatably mounted at one end thereof, means for normally maintaining said cassette loading platform at an inclined position at the time of inserting a cassette into the tape recorder with the other end of the platform maintained at a higher level than said one end, said means permitting said platform to rotate to the horizontal position, a fixed guide member having a vertical guide surface along which said cassette is led for loading said cassette at a predetermined operating position when said cassette loading platform is rotated to the horizontal position, and a cassette inserting section provided with an opening thereto for inserting the cassette, said opening having a sufficiently large width and height to allow insertion of the fingers of the operator to load and unload the cassette from the inserting section into the cassette loading section, said inserting section having shoulders for guiding the cassette, while maintaining the same at a horizontal posture, to said other end of the cassette loading platform.

2. The cassette tape recorder according to claim 1 wherein the rear wall of the cassette loading section is inclined, a mirror is mounted on said inclined rear wall and the lower end of the cassette loading section is opened for accommodating said cassette loading platform.

3. The cassette tape recorder according to claim 1 wherein the front end of said cassette loading platform is bent downwardly so that when the cassette loading platform is maintained in said inclined position said bent front end occupies substantially the same level as the upper surface of said first shoulders.

4. The cassette tape recorder according to claim 1 which further comprises a pair of L shaped horizontal guide members disposed on the opposite sides of said cassette loading platform, the upper legs of said horizontal guide members extend toward each other to overly said cassette loading platform substantially in parallel therewith.

5. The cassette tape recorder according to claim 2 wherein there is provided, at the rear of said cassette loading platform, means for urging the cassette thereby to ensure a steady engagement of the cassette with the magnetic head during playing and to impress the cassette with a force toward the opening of said cassette inserting section during unloading.

6. The cassette tape recorder according to claim 1 wherein said cassette inserting section is provided with first and second shoulders on both sides thereof and above the bottom wall of the cassette inserting section, each first shoulder is formed at a lower level than the second shoulder, the first and second shoulders are provided with a common inclined surface inclining toward said opening, the vertical side surface of each second shoulder connected to the first shoulder is inclined with respect to the direction of insertion of the cassette so as to correct the lateral displacement thereof, the rear end of said bottom wall near said cassette loading section is provided with a downwardly inclining surface.

7. The cassette tape recorder according to claim 6 wherein said bottom wall is provided with flat surfaces on the opposite sides thereof and near the front end for making easy to grasp the cassette by operator's fingers.

8. The cassette tape recorder according to claim 6 wherein the rear end of each first shoulder is provided with a notch, and a guide member having a round top projecting into said notch and an inclined surface is provided between the bottom wall and the cassette loading platform for guiding the cassette.

9. The cassette tape recorder according to claim 8 wherein said guide member is provided with a shoulder near the lower end of said inclined surface for supporting the cassette when it is loaded in the operating position.

10. A cassette tape recorder comprising a cassette containing chamber having an opening for passing a cassette; a door pivotally mounted on the upper end of said opening; and a door operating mechanism including a door locking member disposed in said cassette containing chamber for locking the door in the opened position, a supporting member for said door locking member and provided with a rotatably supported shaft, a sliding member interlocked with said door locking member and disposed on the side surface of said cassette containing chamber, and a door operating button mounted on the sliding member, whereby when said button is operated, the sliding member is moved to cause said door locking member to release said door.

11. The cassette tape recorder according to claim 10 wherein said sliding member carrying said door operating button is provided with a projection, said supporting member carrying said door locking member is provided with a depending member adapted to be engaged by said projection of the sliding member, said sliding member is normally biased by a spring to disengage said projection away from said depending member, and a spring is provided for said rotatably supported shaft for urging said door locking member to engage the door.

12. A cassette tape recorder comprising a cassette inserting section including an opening for passing a cassette; a door pivotally mounted on said cassette inserting section for closing said opening; a cassette loading section connected to said cassette inserting section; a cassette loading platform tiltably mounted in said cassette loading section to form a cassette containing chamber therewith; means for normally maintaining said cassette loading platform in an inclined position for receiving said cassette inserted through said opening; said means permitting said platform to rotate to the horizontal position thereby loading said cassette at a horizontal operation position; and a cassette ejecting mechanism including an ejecting button interlocked with said door such that the ejecting button is operable when the door is maintained in the opened position but not operable when the door is maintained in the closed position, and a cassette push-up lever located beneath said cassette loading platform and operated by said ejecting button for returning said cassette loading platform to said inclined position.

13. The cassette tape recorder according to claim 12 wherein said cassette ejecting mechanism comprises a lever pivotally mounted on said cassette containing chamber at its intermediate point, one end of said lever extending into the cassette inserting section for engaging the cassette, the other end of said lever being pivotally connected to a vertical plate member which is provided with a notch near its lower end, a slide member adapted to engage said notch, an ejecting button, a spring normally urging said slide member to engage said ejecting button, a push-up lever adapted to return said cassette loading platform to the inclined position from said horizontal position, and a member carried by said slide member for operating said push-up lever.

* * * * *

UNITED STATES PATENT AND TRADEMARK OFFICE
CERTIFICATE OF CORRECTION

PATENT NO. : 4,087,844

DATED : May 2, 1978

INVENTOR(S) : Choku Takahashi and Katsutoshi Kinoshita

It is certified that error appears in the above-identified patent and that said Letters Patent are hereby corrected as shown below:

Col. 1, line 21, delete "type".

Col. 1, line 24, change "real" to ---reel---.

Col. 3, line 17, delete "hands" and substitute ---operator's fingers---.

Col. 6, line 6, change "72" (2nd occurrence) to ---73---.

Col. 7, line 43, change "no" to ---not---.

Col. 7, line 47, change "he" to ---the---.

Signed and Sealed this

Seventh Day of November 1978

[SEAL]

Attest:

RUTH C. MASON
Attesting Officer

DONALD W. BANNER
Commissioner of Patents and Trademarks